United States Patent
Williams

(10) Patent No.: US 9,143,727 B2
(45) Date of Patent: Sep. 22, 2015

(54) DUAL-AXIS IMAGE EQUALIZATION IN VIDEO CONFERENCING

(71) Applicant: Herold Williams, West Chester, OH (US)

(72) Inventor: Herold Williams, West Chester, OH (US)

(*) Notice: Subject to any disclaimer, the term of this patent is extended or adjusted under 35 U.S.C. 154(b) by 41 days.

(21) Appl. No.: 14/097,661

(22) Filed: Dec. 5, 2013

(65) Prior Publication Data

US 2014/0092201 A1    Apr. 3, 2014

Related U.S. Application Data

(63) Continuation of application No. PCT/US2012/041135, filed on Jun. 6, 2012.

(60) Provisional application No. 61/493,736, filed on Jun. 6, 2011, provisional application No. 61/494,123, filed on Jun. 7, 2011.

(51) Int. Cl.

| | |
|---|---|
| H04N 7/14 | (2006.01) |
| H04N 7/15 | (2006.01) |
| H04N 5/262 | (2006.01) |
| G06T 3/00 | (2006.01) |
| G06T 3/40 | (2006.01) |

(52) U.S. Cl.
CPC ............... *H04N 7/15* (2013.01); *G06T 3/0093* (2013.01); *G06T 3/40* (2013.01); *H04N 5/2628* (2013.01); *H04N 7/142* (2013.01)

(58) Field of Classification Search
CPC ..... H04N 7/15; H04N 7/142; H04N 5/23238; H04N 7/152; H04N 13/0011; H04N 5/2628; H04N 1/3876; G06T 15/20; G06T 3/0093; G03B 37/04; G03B 37/00
USPC ...................... 348/14.07, 14.08, 14.09, 14.01
See application file for complete search history.

(56) References Cited

U.S. PATENT DOCUMENTS

| | | |
|---|---|---|
| 5,204,944 A | 4/1993 | Wolberg et al. |
| 7,015,954 B1 | 3/2006 | Foote et al. |

(Continued)

FOREIGN PATENT DOCUMENTS

WO    2007005752 A2    1/2007

OTHER PUBLICATIONS

Extended European Search Report dated Nov. 6, 2014 for European Patent Application No. 12797221.4, filed Jan. 3, 2014; European Patent Office; Munich, Germany.

(Continued)

*Primary Examiner* — Stella L Woo
(74) *Attorney, Agent, or Firm* — Thomas E. Lees LLC

(57) ABSTRACT

A video conferencing system is provided that reduces the perspective of an image captured by a video conferencing camera. The perspective is reduced in an image by receiving a first image of a first field of view and receiving a second image of a second field of view. Moreover, the first image is equalized and the second image is equalized independently of the first image. Additionally, the first equalized image is stitched to the second equalized image to create a display image, which can be sent to a display another video conferencing endpoint.

15 Claims, 13 Drawing Sheets

(56) References Cited

U.S. PATENT DOCUMENTS

| | | |
|---|---|---|
| 7,149,367 B2 | 12/2006 | Cutler |
| 7,184,609 B2 | 2/2007 | Liu et al. |
| 7,706,576 B1 | 4/2010 | Beck et al. |
| 2005/0180656 A1 | 8/2005 | Liu et al. |
| 2005/0206659 A1 | 9/2005 | Cutler |
| 2006/0125921 A1* | 6/2006 | Foote ............................ 348/159 |
| 2006/0209194 A1 | 9/2006 | Liu et al. |
| 2007/0206878 A1 | 9/2007 | Liu et al. |
| 2010/0245535 A1 | 9/2010 | Mauchly |

OTHER PUBLICATIONS

Notification Concerning Transmittal of International Preliminary Report on Patentability for PCT Application No. PCT/US2012/041135, mailing date of Dec. 27, 2013, The International Bureau of WIPO, Geneva, Switzerland.

Notification of Transmittal and the International Search Report and Written Opinion of the International Searching Authority for PCT Application No. PCT/US2012/041135, mailing date of Jan. 31, 2013, Korean Intellectual Property Office, Republic of Korea.

\* cited by examiner

DUAL-AXIS IMAGE EQUALIZATION IN VIDEO CONFERENCING

CROSS REFERENCE TO RELATED APPLICATIONS

This application is a bypass continuation of International Application No. PCT/US2012/041135, filed Jun. 6, 2012, entitled "DUAL-AXIS IMAGE EQUALIZATION IN VIDEO CONFERENCING," which claims the benefit of U.S. Provisional Patent Application Ser. No. 61/494,123, filed Jun. 7, 2011, entitled "MULTI-POINT CONFERENCING VIA CROP & STACK SYSTEM," and U.S. Provisional Patent Application Ser. No. 61/493,736, filed Jun. 6, 2011, entitled "DUAL AXIS IMAGE EQUALIZATION IN VIDEO CONFERENCING", the disclosures of which are hereby incorporated by reference.

BACKGROUND

The present disclosure relates in general to video conferencing and, more particularly, to dual-axis image equalization processing of video images captured by a video conferencing system. Conventional conferences involve the co-location of participants at a common location (e.g., a conference room). However, in certain circumstances, it is not possible for all participants of a conference to be co-located within the same conference room. To address this scenario, video conferencing systems have been developed that take advantage of computer networks to transmit video and audio data between two or more geographically separate locations. Basically, the video conferencing system enables the participants at one location (i.e., a local endpoint), to see and hear the participants at a different, remote location (i.e., a remote endpoint).

In its most basic form, a video conferencing system equips each physically separate location participating in the video conference (local endpoint) with a camera, microphone, video display and speaker. The video camera captures video images of the participants at the corresponding local endpoint. The video conferencing system processes the captured video images (e.g., using compression) and transmits the processed video images to the remote endpoint, where the compressed video images are decompressed and displayed. Similarly, the microphone captures audio from the local endpoint, which is transmitted to the remote endpoint of the video conference. Analogously, the audio can be compressed for transmission, and decompressed for audio playback at the remote endpoint.

The video display enables the participants at a local endpoint to view video captured at the remote endpoint. The display may also be utilized to view other forms of media, such as images, slide presentations and video clips. Likewise, the speaker enables the participants at a local endpoint to hear audio captured by the microphone at the remote endpoint. The speaker may also be used to play media, such as audio files. As such, participants at each location of the video conference can see and hear the participants at other location, as well as see and hear any other forms of media presented during the conference.

BRIEF SUMMARY

According to aspects of the present invention, a video conferencing system comprises a first camera including a lens, a second camera including a lens and a processor coupled to the first camera and the second camera. The video conferencing system also includes an output coupled to the processor. The first camera is positioned at a determined angle to create a first image of a first scene within a first field of view. Likewise, the second camera is positioned at a determined angle to create a second image of a second scene within a second field of view. The processor receives the first image and equalizes the first image with a dual-axis warping function. The processor receives the second image, and equalizes the second image independently of the first image, where the second image is also equalized with a dual-axis warping function. The processor further stitches the first equalized image to the second equalized image to create an display image and sends the display image to the output.

According to further aspects of the present invention, a method for adjusting the perspective of images captured by a video conferencing system comprises receiving a first image of a first scene within a first field of view and receiving a second image of a second scene within a second field of view. The method further comprises equalizing the first image, where the equalization is based upon a dual-axis warping function. The methods still further comprises equalizing the second image independently of the first image, where the equalization is based upon a dual-axis warping function. The method also comprises stitching the first equalized image to the second equalized image to create a display image and sending the display image to an output.

DETAILED DESCRIPTION

Figure 1:
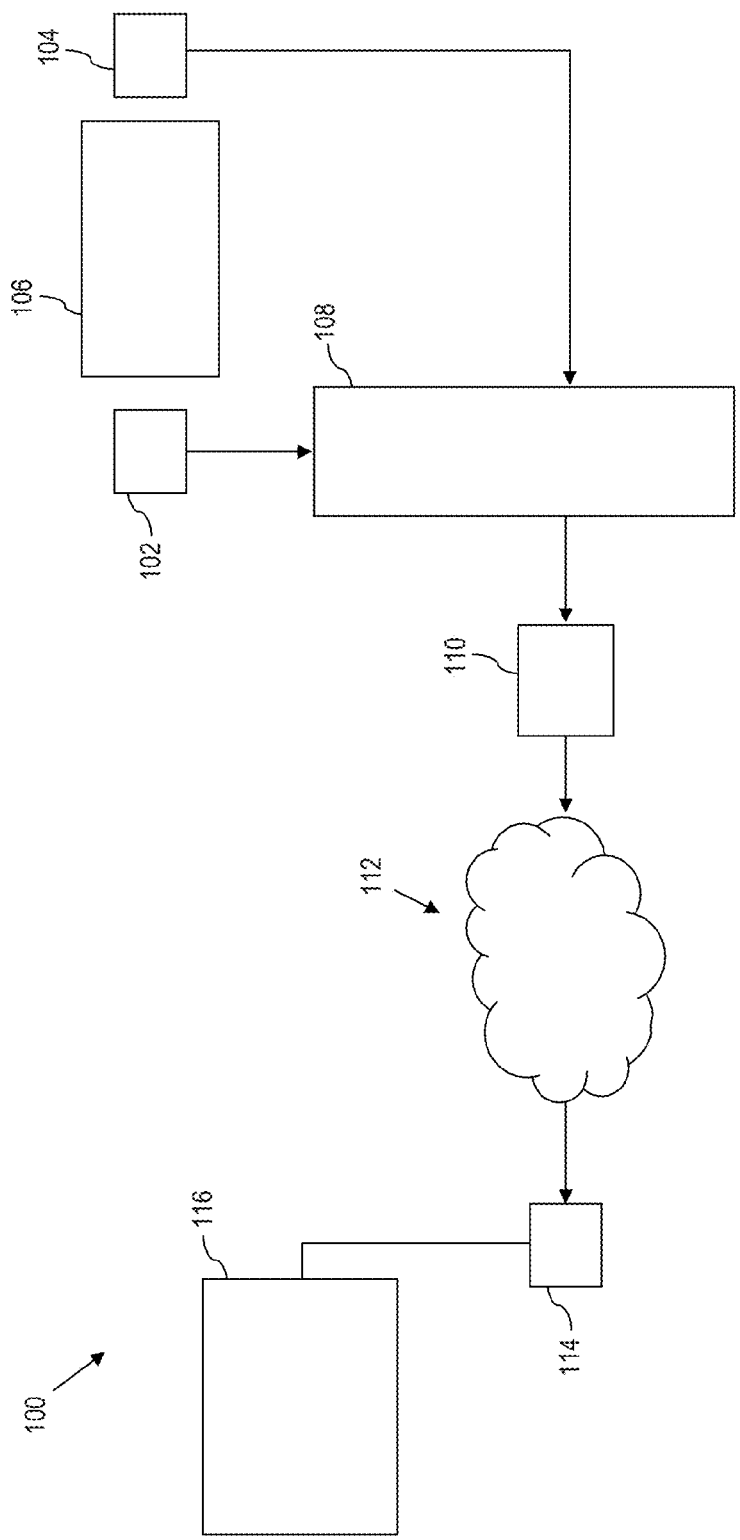
FIG. 1 is a block diagram of a video conferencing system according to various aspects of the present invention.

A typical conference room that is set up as a video conferencing endpoint, includes an output device such as a video screen or display monitor that is positioned towards a first end of a conference room table. Participants of a video conference sit on either side of the table, or otherwise sit around the table so as to face the video screen. Because the gaze of participants is often directed towards the display screen, a video camera is often placed on top of the video screen so that an image of the faces (or at least the heads) of the participants in the conference room can be captured. The video images captured by the video camera are transmitted to another geographically remote endpoint location for display on a corresponding video screen.

However, because of the video camera positioning relative to the participants, there is a depth of field disparity between participants that are seated close to the video camera relative to participants seated far away from the video camera. The resulting differences in perspective cause the participants at the near end of the table closest to the video camera to appear much larger than the participants at the far end of the table (i.e., farthest away from the video camera). Moreover, using conventional video conferencing systems, it may be difficult to make out the faces or facial expressions of the participants furthest away from the video camera.

According to aspects of the present invention, a video conferencing system is provided that processes image data captured by a video conferencing camera so that equalized video images are transmitted to a remote endpoint location. In general, the image equalization processing adjusts the perspective of the captured image data such that each participant, regardless of their seating position at the conference table, appears in the image to be of similar size. Stated another way, the image equalization distorts the image in a way intended to "undo" the image artifacts caused by depth of field effects that make objects appear smaller than they actually are as the object is positioned further back in the scene captured by the image. In illustrative implementations, image equalization is implemented as dual-axis processing so that the heads of the participants of the video conference appear to be generally the same/similar size and maintain proper proportion, despite the depth of field disparity between participants closest to the video camera relative to participants at the far end of the table.

In an illustrative implementation of the present disclosure, an optical lens system is provided with a "gradient" field of view that captures a desired scene (e.g., a portion of the participants seated around a conference room table or all of the participants seated around the conference table). The optical lens system optically equalizes the conference image with respect to the participants within the field of view. In yet another illustrative implementation, a digital image processing method is employed to equalize the video image with respect to the participants within the field of view. In yet a further implementation, image equalization is executed by combining optical and digital image equalization techniques. Equalization, as it pertains to aspects of the present invention, is set out and described in greater detail herein.

Referring now to FIG. 1, a video conferencing system 100 according to various aspects of the present invention is shown. The video conferencing system 100 includes two cameras 102, 104 (e.g., sensors, image processing devices, video camera having a lens, etc.) that capture the scenes within their respective fields of view and create images of those scenes. Preferably, the scenes within the fields of view include some area of interest. For example, if the video conferencing system 100 is located in a conference room, then the first camera 102 creates images of participants sitting on one side of a table, while the second camera creates images of participants sitting on another side of the table.

The cameras 102, 104 are positioned anywhere that provides advantageous view of their respective areas of interest. For example, the cameras 102, 104 can be spaced apart from each other with a display screen 106 between the two cameras 102, 104, as shown in FIG. 1. However, the cameras 102, 104 may be placed at essentially the same point or spaced apart without a display screen between the two cameras 102, 104. Further, the cameras 102, 104 may be placed at any desired height. For example, the cameras 102, 104 may be placed at approximately eye level of a person seated at a conference table; as such, the pitch of the cameras 102, 104 may be zero degrees relative to a horizontal plane. In this regard, the cameras 102, 104 may be set at a height of approximately four feet (approximately 1.2 meters) or other height corresponding to eye level of the participants. Alternatively, the cameras 102, 104 may be set to a slight pitch.

The cameras 102, 104 communicate the captured images to a processing system 108, which includes one or more processors such as, but not limited to: a microprocessor, a microcontroller, a field programmable gate array (FPGA), an application specific integrated circuit (ASIC), programmable logic device (PLD), or any combination thereof. The processing system 108 obtains the images from the cameras 102, 104 and performs an equalization process to give viewers of the images a pleasant video conferencing experience. Basically, the equalization process warps the images such that the heads of the people represented in the image are approximately the same or similar size. The equalization process may also modify the images such that the heads are aligned at approximately at the same level within the equalized image when the heads of the participants are generally aligned at the same level at the table. The equalization process is described in greater detail below in reference to FIGS. 2-8.

Further, the processing system 108 performs other actions on the images. For example, if the images from the cameras 102, 104 include more pixels than the video displays in the system can handle, then the processing system 108 scales the images to fit the displays. Also, the processing system combines the two equalized images to produce a display image. For example, the processing system can combine two images by placing the images side-by-side and blending the two images together such that there is a gradual transition from one image to the next. Alternatively, the processing system 108 can combine the two images by placing the images side-by-side and "stitching" them together such that there is a hard transition (i.e., not a gradual transition) between the two images.

After the display image is created, the processing system 108 sends the display image via an output (e.g., port, transceiver, input/output (I/O), etc.) to a destination. For instance, the output may be coupled to a codec 110, which encodes the display image for transmission over a network 112. The display image is sent across the network 112 to a second codec 114 that decodes the display image. That decoded display images is sent to a remote display 116 in a different conference room than the cameras 102, 104 and is displayed on the remote display 116. Thus, the remote display 116 in the remote conference room is coupled to the processing system through the codecs 114, 110 and the network 112. The remote display 116 may be an LCD display, plasma display, OLED display, LED display, or any other terminal that is capable of displaying an image.

Optionally, the system 100 can include other subsystems (not shown) between the second codec 114 and the remote display 116, and those subsystems can perform other manipulations of the display images before display on the remote display 116. These subsystems are explained in greater detail in reference to FIGS. 10-15.

Thus, as an illustrative example, the first camera 102 and a second camera 104 are arranged such that the first camera 102 is positioned at a determined angle to create a first image of a first scene within a first field of view and the second camera 104 is positioned at a determined angle to create a second image of a second scene within a second field of view. The processor of the processing system 108 receives the first image, receives the second image, equalizes the first image with a first dual-axis warping function, and equalizes the second image independently of the first image using a second dual-axis warping function. The processor of the processing system 108 also stitches the first equalized image to the second equalized image to create a display image and sends the display image to an output, as will be described in greater detail herein.

In a further example, a first predefined warping function removes perspective from the first image such that the first image appears to have been taken at an angle different from the angle at which the first image was created by the first camera. Similarly, a second predefined warping function removes perspective from the second image such that the second image appears to have been taken at an angle different from the angle at which the second image was created by the second camera. As a further example, the first predefined warping removes imaging defects imputed on the image by the lens of the first camera and the second predefined warping removes imaging defects imputed on the image by the lens of the second camera.

Still further implementations can also be implemented. For instance, in a particular example, the first predefined warping function is identical to the second predefined warping function. Also, the video conferencing system 100 can include additional structures. For instance, the video conferencing system 100 can include a mounting mechanism that mounts the first camera 102 such that the pitch of the first camera 102 is at zero degrees, e.g., to aim the first camera at eye level of the participants of the video conference. Similarly, a mounting mechanism can also be used to mount the second camera 104 such that the pitch of the second camera 104 is at zero degrees. As yet another example, the first mounting mechanism can be spaced apart from the second mounting mechanism.

Figure 2:
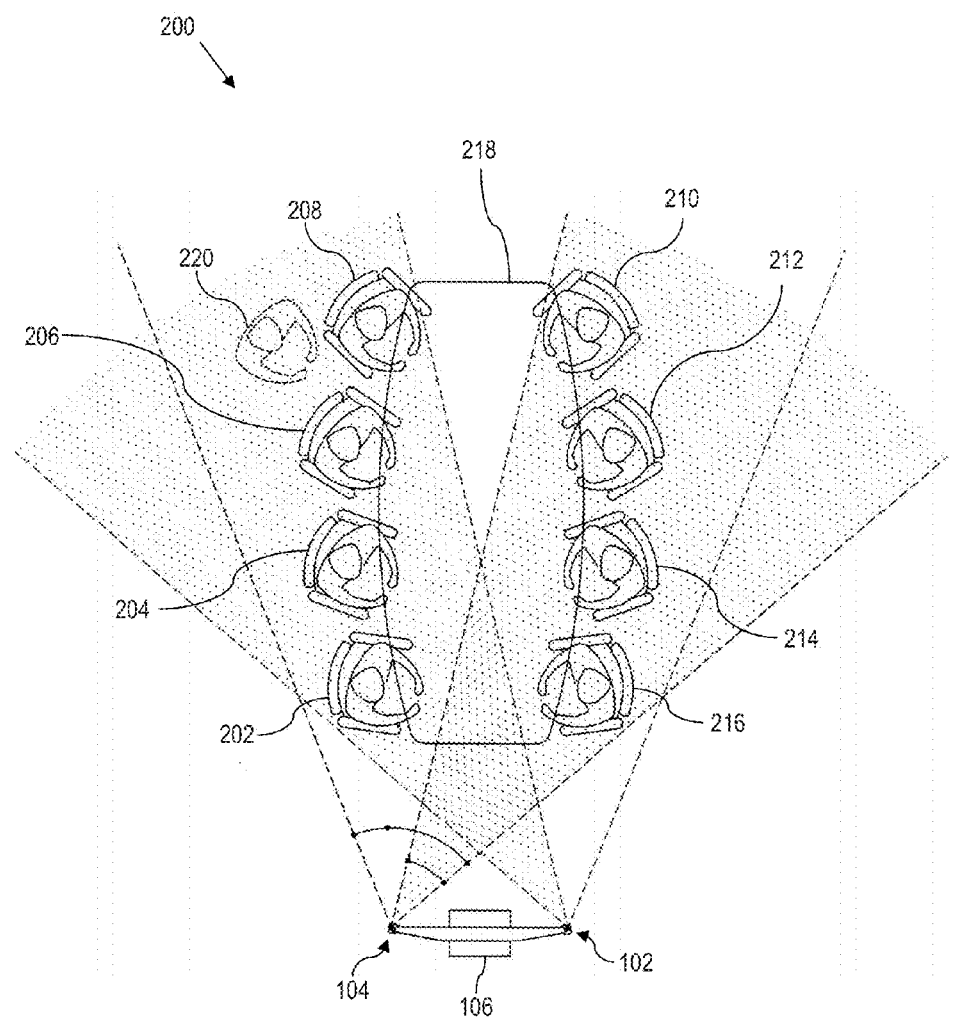
FIG. 2 is a schematic of an exemplary scene of a conference room with two cameras, according to various aspects of the present invention.

Referring now to FIG. 2, a scene of an exemplary conference room 200 with an embodiment of a portion the teleconference system 100 having the two cameras 102, 104 and the local display 106 is shown. The scene of the exemplary conference room 200 includes a group of participants 202-216 situated around a conventional conference room table 218. Further, another participant 220 is standing in the background. The first camera 102 is situated on the right side of the conference room (looking out from the cameras 102, 104 towards the participants 202-216) such that the first camera's field of view includes at least the left-hand side of the conference room. Thus, the first camera 102 points at participants 202-208 (as shown in better detail in FIG. 3) and the standing participant 220. Likewise, the second camera's field of view includes at least the right-hand side of the conference room. Thus, the second camera 104 points at participants 210-216.

Thus, in the illustrative example, the area of interest of the first image does not overlap the area of interest of the second image.

Figure 3:
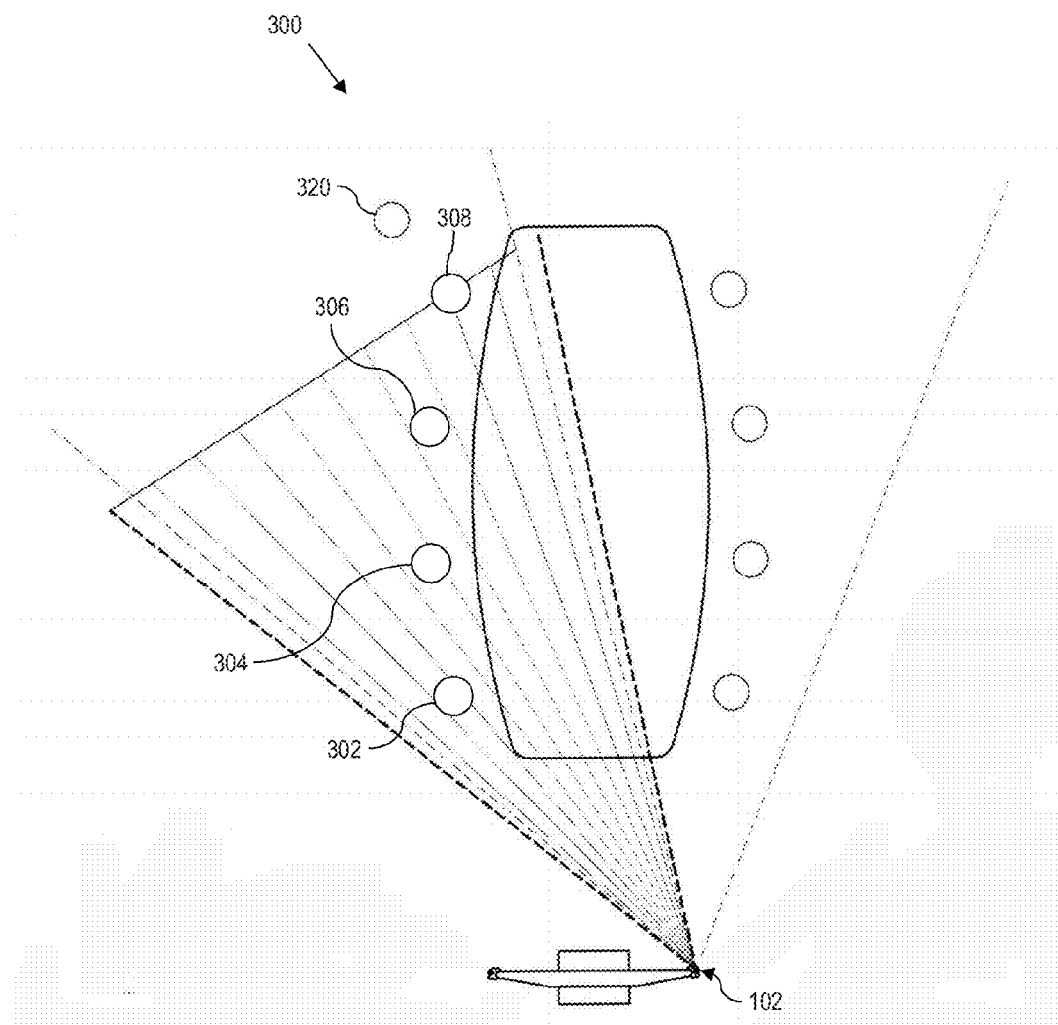
FIG. 3 is a simplified schematic of the scene of FIG. 2, according to various aspects of the present invention.

Referring now to FIG. 3, a simplified illustration 300 of the scene of FIG. 2 is shown. As mentioned above in reference to FIG. 2, the first camera 102 captures a first scene within its field of view that includes four of the seated participants 202-208 and the standing participant 220. In FIG. 3, the four seated participants on the left side are denoted by circles 302-308 where circle 302 represents participant 202, circle 304 represents participant 204, etc. Also, circle 320 represents the standing participant 220.

Note that if an imaginary line were drawn between circle 302 and circle 308, the first camera 102 would be capturing the image at an angle significantly different than ninety degrees. Thus, the resulting image will include aspects of perspective. If the camera 102 were positioned such that the angle of the camera 102 in reference to the imaginary line is closer towards ninety degrees, aspects of perspective would be lessened. The perspective caused by camera angle positions the participants at different depths of field within the first scene. This causes the participants further away from the first camera to appear in the image to be smaller than they actually are, as will be described in greater detail herein.

Figure 4:
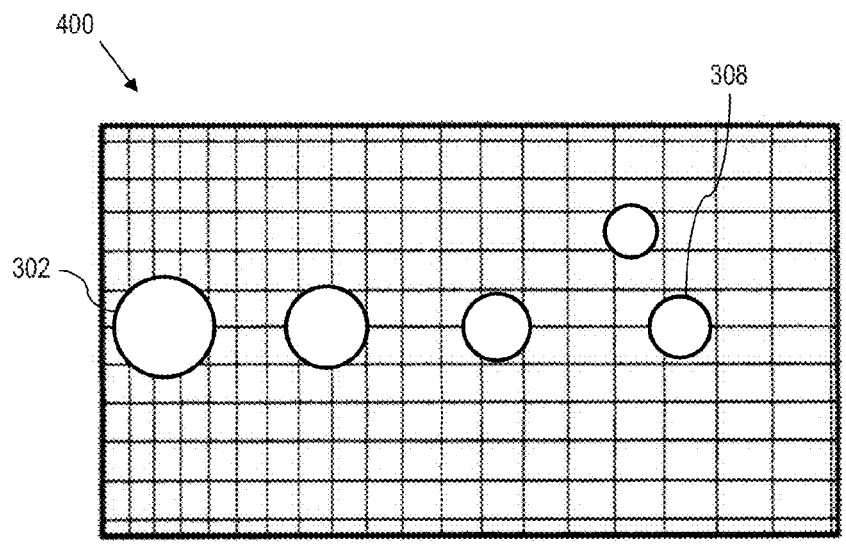
FIG. 4 is an illustration of an exemplary image taken by one of the cameras of FIGS. 2-3, according to various aspects of the present invention.

Referring now to FIG. 4, a representation of an exemplary image 400 created by the first camera (FIGS. 1-3, 102) is shown. When the first camera 102 captures an image of a scene within its field of view, the participants closer to the first camera 102 (e.g., participant 202) will appear to be larger than the participants farther away from the first camera 102 (e.g., participant 208). Thus, the circle 302 representing the participant closest to the camera appears larger than the circle 308 representing the seated participant farthest away from the camera. In other words, the image 400 includes aspects of perspective. Thus, in the image 400, the circles are largest on the left-hand side (i.e., closest to the camera) and gradually decrease in size as the image goes from left to right (i.e., moves farther away from the camera). In the illustrative example, the radius of circle 302 is about twice the size of the radius of circle 308; thus, circle 308 has one-fourth the area of circle 302 ($A=\pi*r^2$). To compensate for the perspective captured in the image of the scene, the image is sent to the processing system (FIG. 1, 108) for equalization.

Figure 5:
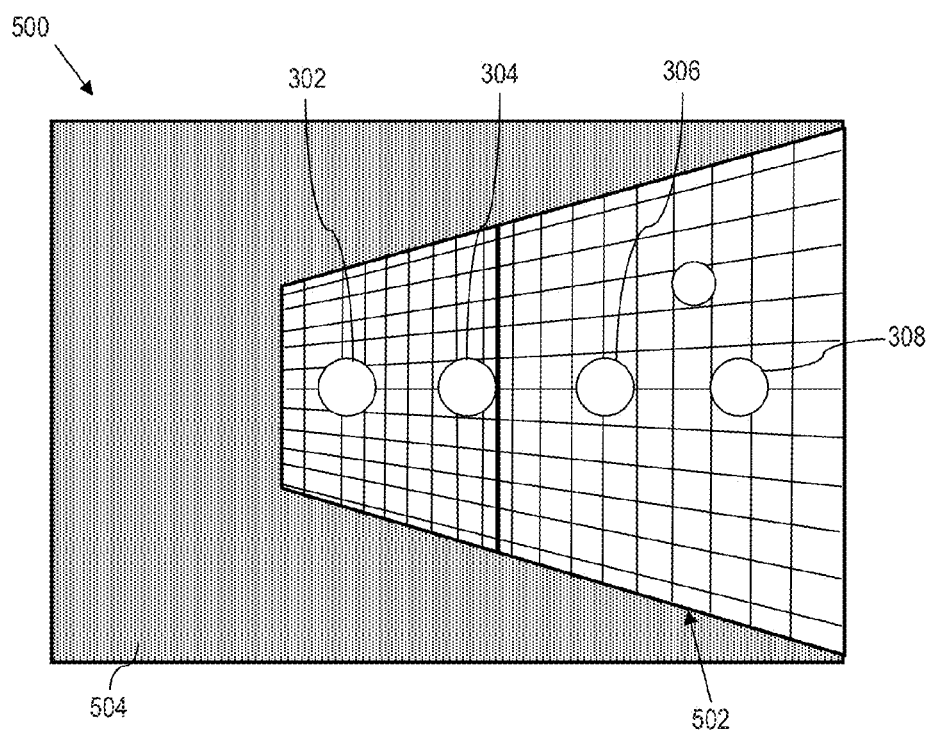
FIG. 5 is an illustration of the exemplary image of FIG. 4 with equalization performed, according to various aspects of the present invention.

Turning now to FIG. 5, the equalization process includes a dual-axis warp (i.e., vertical and horizontal warp). For this example, the camera creates images with 2304 pixels across and 1536 pixels high (2304×1536). However, the remote display has a resolution of 1920×1080. Thus, the image includes more resolution that is required for display. As such, the processing system scales the image to the proper resolution during equalization. However, instead of a linear scaling, where all of the scaling is performed uniformly throughout the image, the equalization process of the present invention uses "gradient scaling."

As an illustrative example, the processor uses a first predefined warping function to warp the first image using gradient scaling such that the first image appears to be projected onto a portion of a sphere and the second predefined warping function warps the second image using gradient scaling such that the second image appears to be projected onto a portion of a sphere.

With gradient scaling, the farther away a pixel is from a point of origin on the image, the more scaled that pixel is. For example, in the image of FIG. 4, the point of origin is halfway up the right edge of the image. The pixels closest to the origin remain the same or have little scaling performed. However, the farther a pixel is away from the origin, the more scaling is performed on the pixel (e.g., combining more pixels to create one pixel). As a result, more scaling is performed on circle 302 than circle 308. A resulting image has less rows and columns of pixels than the original image.

With an exemplary dual-axis warping function with gradient scaling, the image of FIG. 4 is warped into the image of FIG. 5. The trapezoid 502 illustrates useful pixels in the equalized image 500, while the grey-shaded area 504 illustrates pixels that are not useful in creating an image for display later on. With the exemplary dual-axis equalization process, the image of FIG. 4 is virtually rotated away from a viewer around the right edge of the image giving the illusion that the images on the left-hand side are pushed back and pushed to the left.

As a result of the above-processing, the circles 302-308 are all of a similar size in the equalized image 500. Thus, the equalization process has reduced the amount of perspective present in the image when creating the equalized image. In other words, the equalization process has reduced the amount of depth in the image when creating the equalized image. Another way to think about the equalization process is that the process makes the image look like it was taken from an angle closer to ninety degrees from an imaginary line connecting circle 302 (in FIG. 3) to circle 308 (in FIG. 3), when in reality, the angle of the camera is substantially different than a generally ninety degree angle (as shown in FIG. 3).

The exemplary dual-axis equalization function that creates a trapezoid is merely for illustrative purposes only. Other functions may be used and one such function is described in greater detail below in reference to FIG. 8.

In some embodiments, the equalization process identifies an area of interest within the image before performing the warping function. As such, the areas of the image not included in the area of interest may be cropped out before the warping function is applied. For example, if the image only includes participants in one-third of the horizontal axis, then the two-thirds of the image that do not include participants is cropped out before the warping function is applied. However, the area of interest may be the entire image, not just a sub-set of the image.

As can be seen from the example above, the equalization of the image from the first camera can be implemented entirely without any input from an image from the second camera, and vice versa.

One of the benefits of the dual-axis gradient scaling is that there is less distortion of the images from a true representation because both the horizontal and vertical directions are warped. Thus, in regard to closely packed pixels, the distortion from one pixel to another is not as high as if the pixels were warped with a single-axis warping function.

Figure 6:
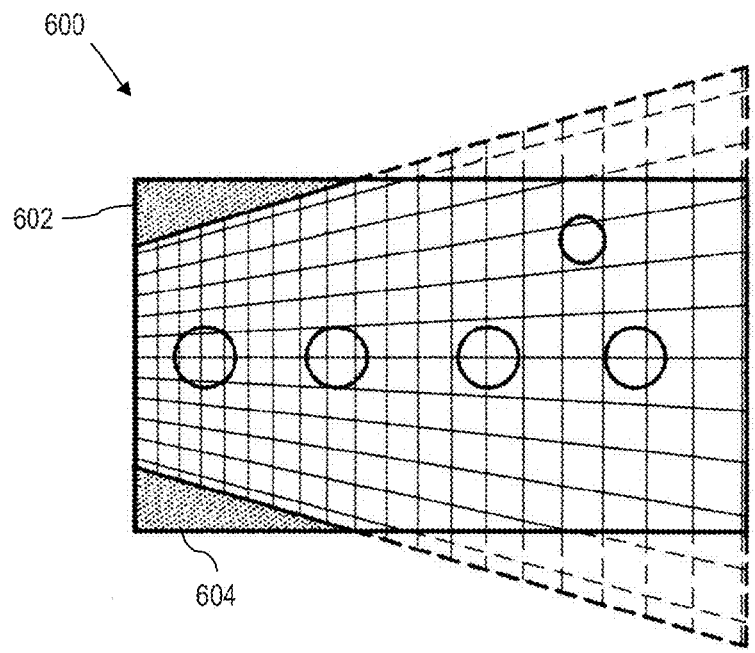
FIG. 6 is an illustration of the exemplary image of FIGS. 4-5 with equalization performed to expand portions of the image, according to various aspects of the present invention.

Referring now to FIG. 6, an image 600 including equalization performed to expand portions of the image is shown. After the equalized process (or as part of the equalization process) the equalized image is sized for later display. Recall that in the exemplary system 100, the remote display (FIG. 1, 116) has a resolution of 1920×1080. As will be described in greater detail in reference to FIG. 7, two images are displayed at the same time on the remote display. Therefore, the equalized images should have a resolution of 960×1080 if the two images are stitched side-by-side. If the equalization process produces a left edge that is 1080 pixels high, then the processing system just needs to crop off any pixels in the entire image that are above or below the useful pixels on the left edge.

However, if the left edge has less than 1080 pixels (as shown in FIG. 6), then portions of the resultant image for display may include "Areas of No Image" as denoted by the grey spaces 602, 604. For example, the relatively small areas of no image 602, 604 illustrated in FIG. 6 are typically blank portions of a background conference room wall or floor. As such, additional pixels may be added to the image to further reduce the "Area of No Image." The relatively small remaining "Area of No Image" 602, 604 can be eliminated by increasing or exaggerating image warping in near these relatively small portions of the image without significant loss of display performance because these portions of the image are typically allocated to relatively static or insignificant portions of the field of view.

Also, the equalized image is cropped such that the resultant image is proper for display (e.g., 960×1080). However, this cropping may occur in the equalization process, on the other system not shown in FIG. 1 between the second codec 114 and the remote display 116, elsewhere, or a combination thereof.

Concurrently or separately, an image from the second camera may also be equalized using the same warping function, a completely different warping function, or a mirror image of the warping function used to equalize the image from the first camera. In the exemplary system shown, the second warping function would probably be a mirror image of the first warping function. However, that is not necessary.

Figure 7:
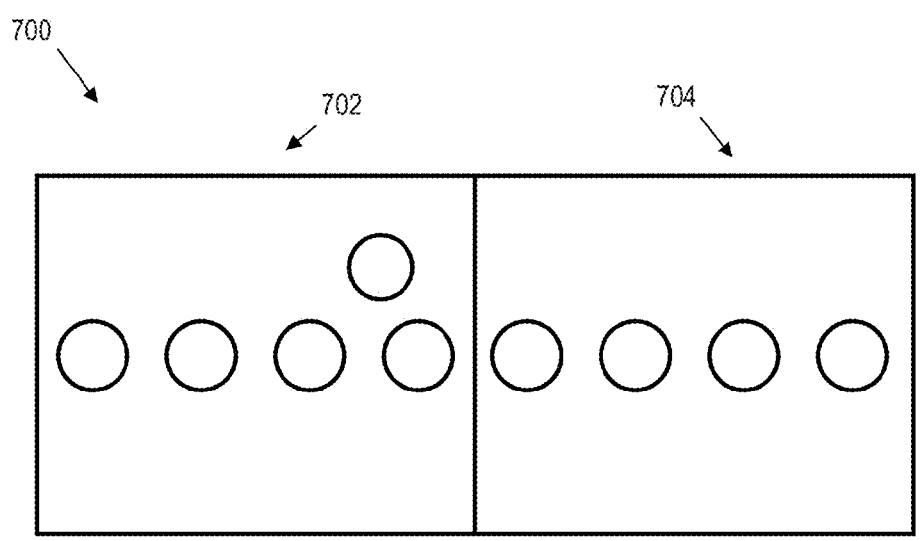
FIG. 7 is an illustration of the exemplary image of FIGS. 4-6 stitched to another equalized image for display, according to various aspects of the present invention.

Referring now to FIG. 7, an image 700 created from stitching together an equalized image with another equalized image is shown. Once the image from the first camera and the image from the second camera are equalized, the two equalized images are combined to product an display image to be sent to the remote display via a network. In the exemplary system, the first camera captures the left side of the scene and the second camera captures the right side of the scene. As such, when combining the equalized images, the equalized image 702 from the first camera is placed on the left and the equalized image 704 from the second camera is placed on the right. Then the two are combined. Any combining method may be used including, but not limited to: "stitching" the two images at the common edge, blending the images, etc. As such, the stitching of the first equalized image to the second equalized image can be implemented independent of blending of the first equalized image and the second equalized image.

Figure 8:
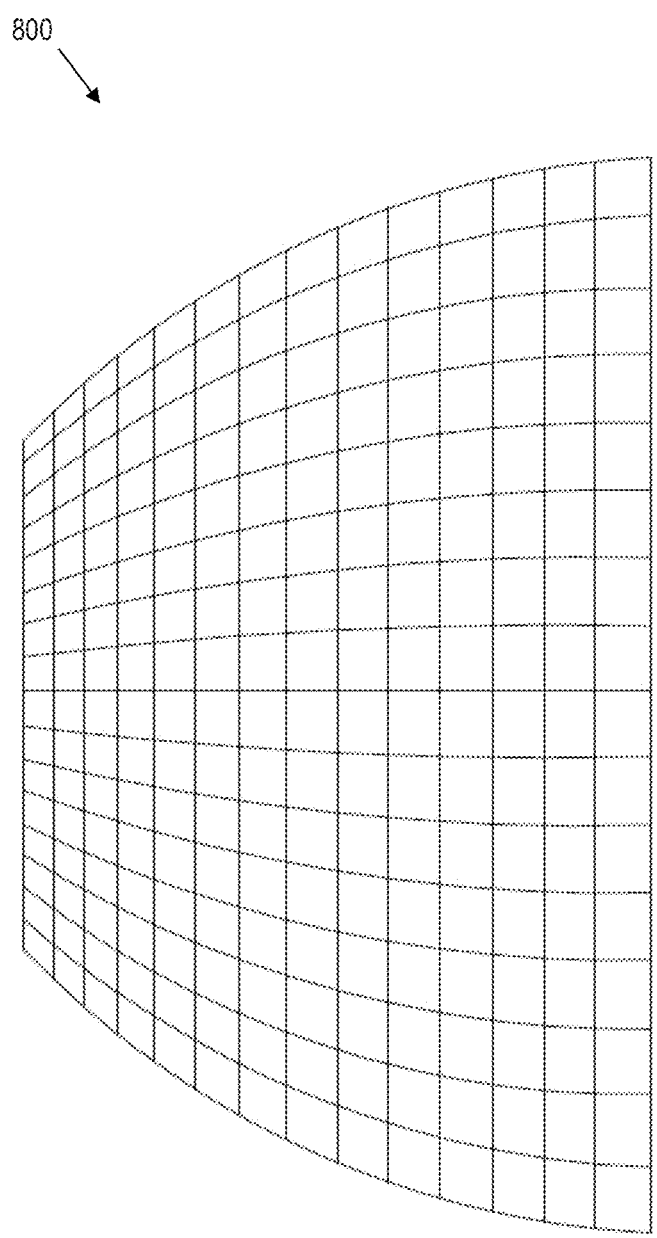
FIG. 8 is an illustration of an exemplary warp map, according to various aspects of the present invention.

Referring now to FIG. 8, an exemplary warping map 800 is shown. As mentioned above, any warping function may be used (e.g., the warping function that results in the perfect trapezoid of FIG. 5). However, other warping functions may be used such as a function that makes the image appear as if it is being displayed on a portion of a sphere (as opposed to a flat surface), as shown in FIG. 8. Other warping functions include a combination of the sphere function of FIG. 8 and the trapezoid function of FIG. 5, functions that adjust for defects in the lenses of the camera, functions that adjust the height of some areas of the image while leaving the height of other areas alone, and other functions. The warping functions may be predefined.

Figure 9:
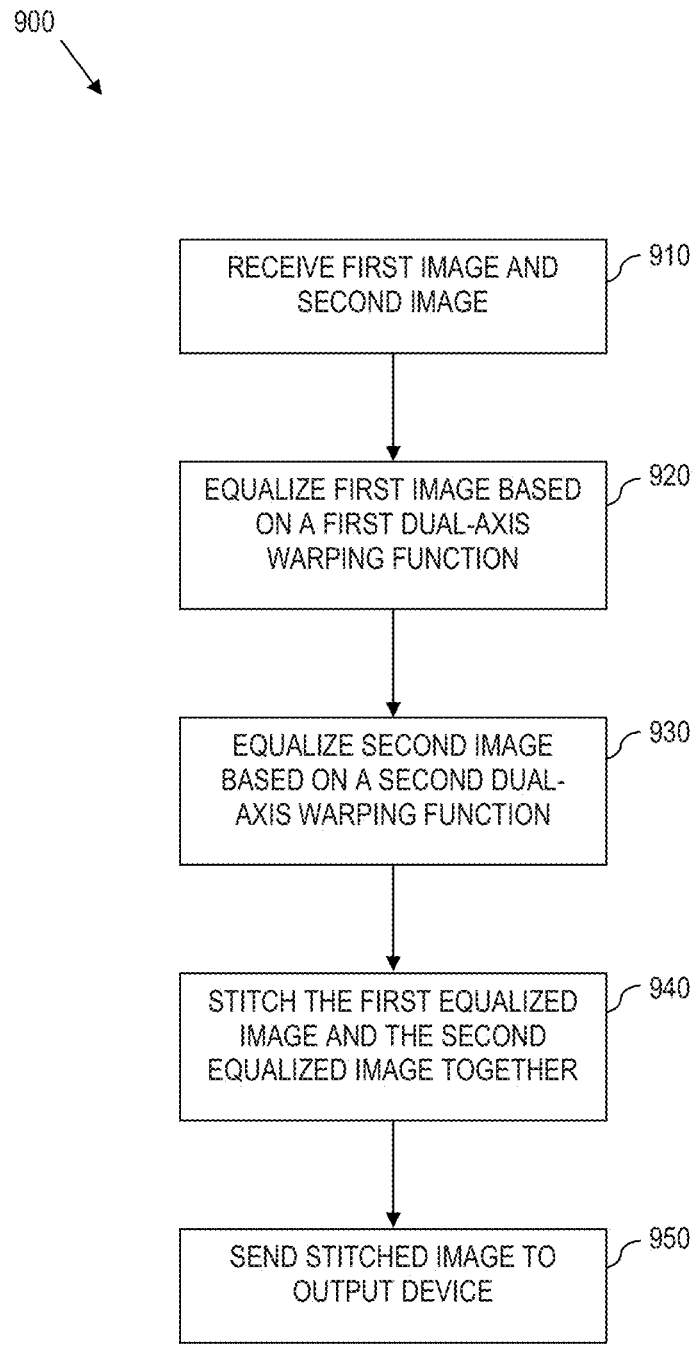
FIG. 9 is a flow chart illustrating a method to reduce perspective in an image, according to various aspects of the present invention.

Referring now to FIG. 9, a method 900 illustrating an equalization process according to aspects of the present invention is shown. At 910, a first image and a second image are received. At 920, the first image is equalized based on a first dual-axis warping function, and at 930, the second image is equalized based on a second dual-axis warping function. However, the second image is equalized independently from any information from the first image. The resulting equalized images are stitched together to create a display image at 940, and that display image is sent to an output device at 950.

In a manner analogous to that set out in greater detail herein, equalizing the first image can include identifying an area of interest in the first image and warping the area of interest in the first image according to a first predefined warping function. Similarly, equalizing the second image can include identifying an area of interest in the second image and warping the area of interest in the second image according to a second predefined warping function.

As yet further illustrative examples, warping the area of interest in the first image according to a first predefined warping function can include warping the first image using gradient scaling such that the first image appears to be projected onto a portion of a sphere and warping the area of interest in the second image according to a second predefined warping function can include warping the second image using gradient scaling such that the second image appears to be projected onto a portion of a sphere.

As yet further examples, warping the area of interest in the first image according to a first predefined warping function can include removing perspective from the first image such that the first image appears to have been taken at an angle different from the angle at which the first image was taken and warping the area of interest in the second image according to a second predefined warping function can include removing perspective from the second image such that the second image appears to have been taken at an angle different from the angle at which the second image was taken.

In some embodiments, the equalization is performed without any electronics. Instead, the lenses of the first and second cameras may be fitted with gradient lenses to perform the warping functions optically instead of electronically. However, the two types of equalization are not mutually exclusive. In other words, the system may have both optical warping and electronic warping.

According to yet further aspects of the present invention, a system is provided for reducing perspective of an image. The system comprises a first camera including a gradient lens, wherein the first camera creates a first image of a first field of view. The first image has a number of columns and a number of rows. A display is coupled to the first camera, wherein the display displays the first image. The system can further include a second camera with a gradient lens, wherein the second camera creates a second image of a second field of view, the second image having a number of columns and a number of rows and the display further displays the second image.

In another illustrative example, the processor horizontally crops the first image to reduce the number of columns of the first image, the processor horizontally crops the second image to reduce the number of columns of the second image and the processor stitches the first cropped image to the second cropped image for display. In yet a further implementation, the first camera and second camera are generally positioned at eye level.

The systems and methods described herein allow participants of a video conference to view an image taken at an angle as if the image were taken at an angle closer to ninety degrees to the subjects of interest (in a manner that reduces perspective errors caused by depth of field). Thus, when assembled, the resultant images allow for participants to view the subjects in the entire image with approximately the same resolution and clarity throughout the image.

Also, instead of placing the cameras at a ninety degree angle from the subjects, the cameras may be place at the front of the room near a display, so when a subject is addressing a viewer in a conference, then the subject will be looking at the camera and viewing a display in the subject's conference room.

In certain illustrative applications, a video conferencing system may utilize multiple participants and/or multiple displays. In this regard, a challenging aspect to video conferencing is the ability to transmit an image that captures a large number of participants, while optimizing image quality and bandwidth usage. Conventional systems often suffer from inefficient use of bandwidth, poor quality, or both, and often fail to capture an entire scene or effectively transmit images to and from conference rooms with different display and image capture configurations.

However, according to further aspects of the present invention, video conferencing methods and display systems are provided that employ cropping, stacking, scaling, and coding techniques to transfer images back and forth between dissimilar conference configurations.

Figure 10:
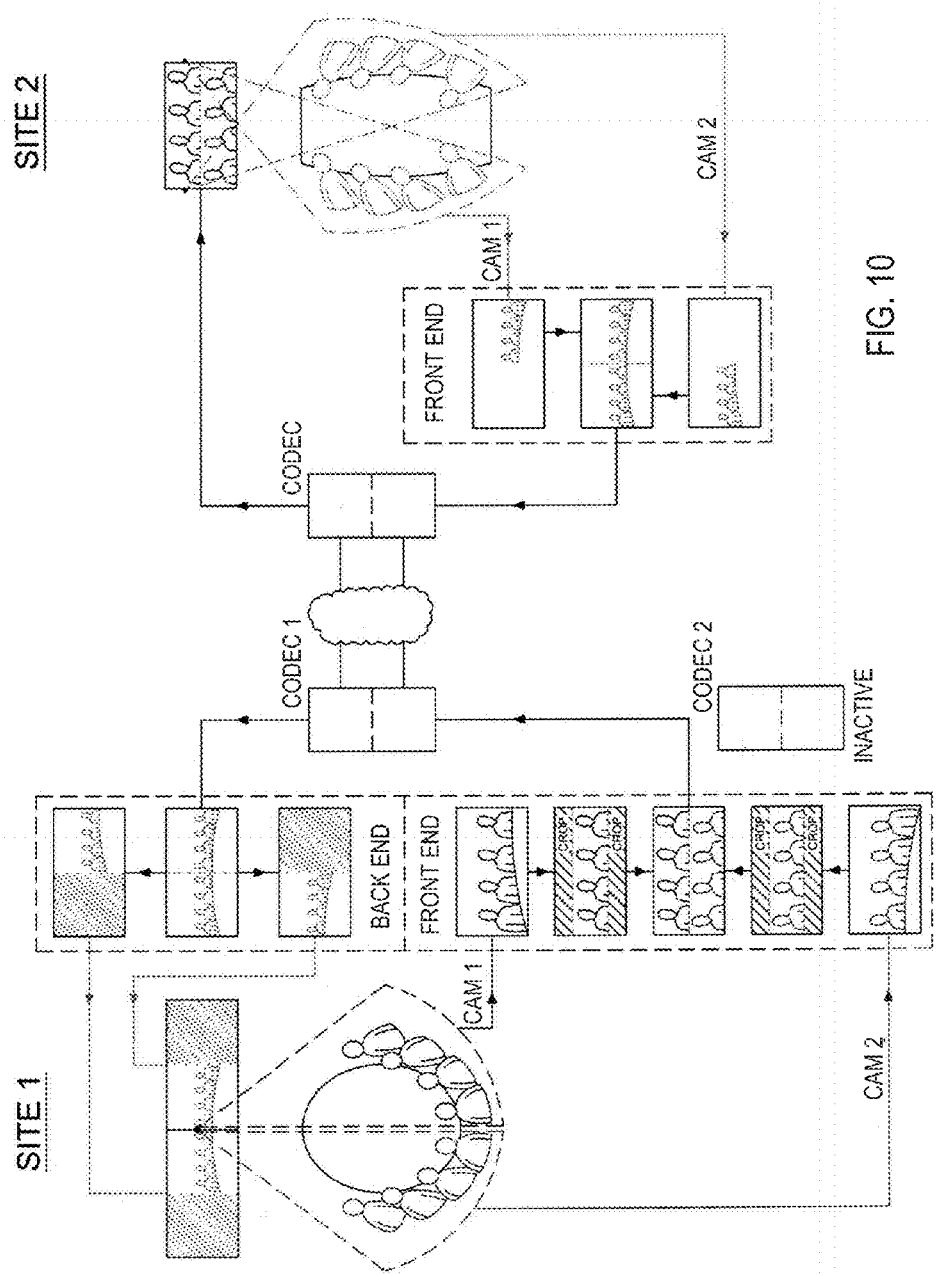
FIG. 10 illustrates a point-to-point video conferencing system according to aspects of the present disclosure.

The point-to-point video conferencing system illustrated in FIG. 10 is well suited for video conferencing between two sites where Site 1 comprises a dual-scene conference room ("CCR 8") and Site 2 comprises a single display, single scene conference room. Typically, Site 1, the dual-scene conference room, will comprise an elongated, circular or semicircular conference configuration and Site 2 will comprise a more limited conference room configuration that is more amenable to single scene capture and display, as is illustrated in FIG. 10.

According to the methodology illustrated in FIG. 10, Site 1 is captured by an image processing device and each image is individually cropped, encoded, and stacked into a single image for optical, hardwired, or wireless transmission via a network to the downstream conference room at Site 2. The single image is displayed at Site 2 as a single, stacked image on its single display. Moving back upstream, the single scene at Site 2 is captured by an image processing device and is encoded for transmission via the network to the upstream conference room at Site 1, where the image is decoded, divided, cropped, or a combination thereof so that the divided portions can be displayed on different ones of the two displays at Site 1. Stated differently, instead of merely displaying the image as a whole on either Display 1 or Display 2 at Site 1, the image is divided and displayed side-by-side on the centermost halves of Display 1 and Display 2.

Figure 11:
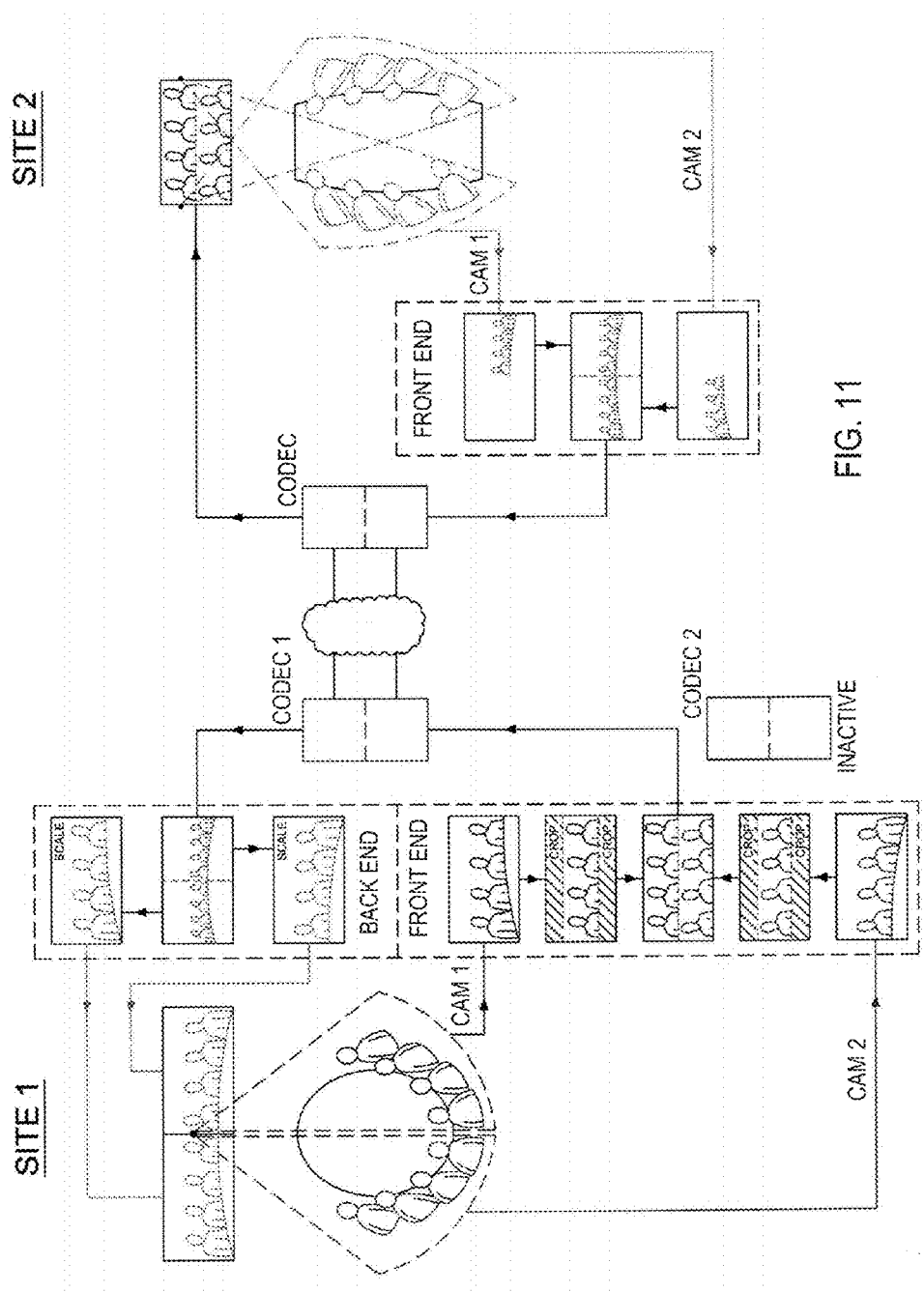
FIG. 11 illustrates a point-to-point video conferencing system according to further aspects of the present disclosure.

The point-to-point video conferencing system illustrated in FIG. 11 is also well suited for video conferencing between two sites where Site 1 comprises a dual-scene conference room and Site 2 comprises a single display, single scene conference room. The image processing methodology illustrated in FIG. 11 differs from that illustrated in FIG. 10 with respect to the manner in which the image from Site 1 is processed and encoded prior to being sent to Site 2. More specifically, Site 1 is cropped and scaled for side-by-side display (as described in greater above) at Site B, as opposed to the stacked display of FIG. 10. Otherwise, the system of FIG. 11 is analogous to the system of FIG. 10.

Figure 12:
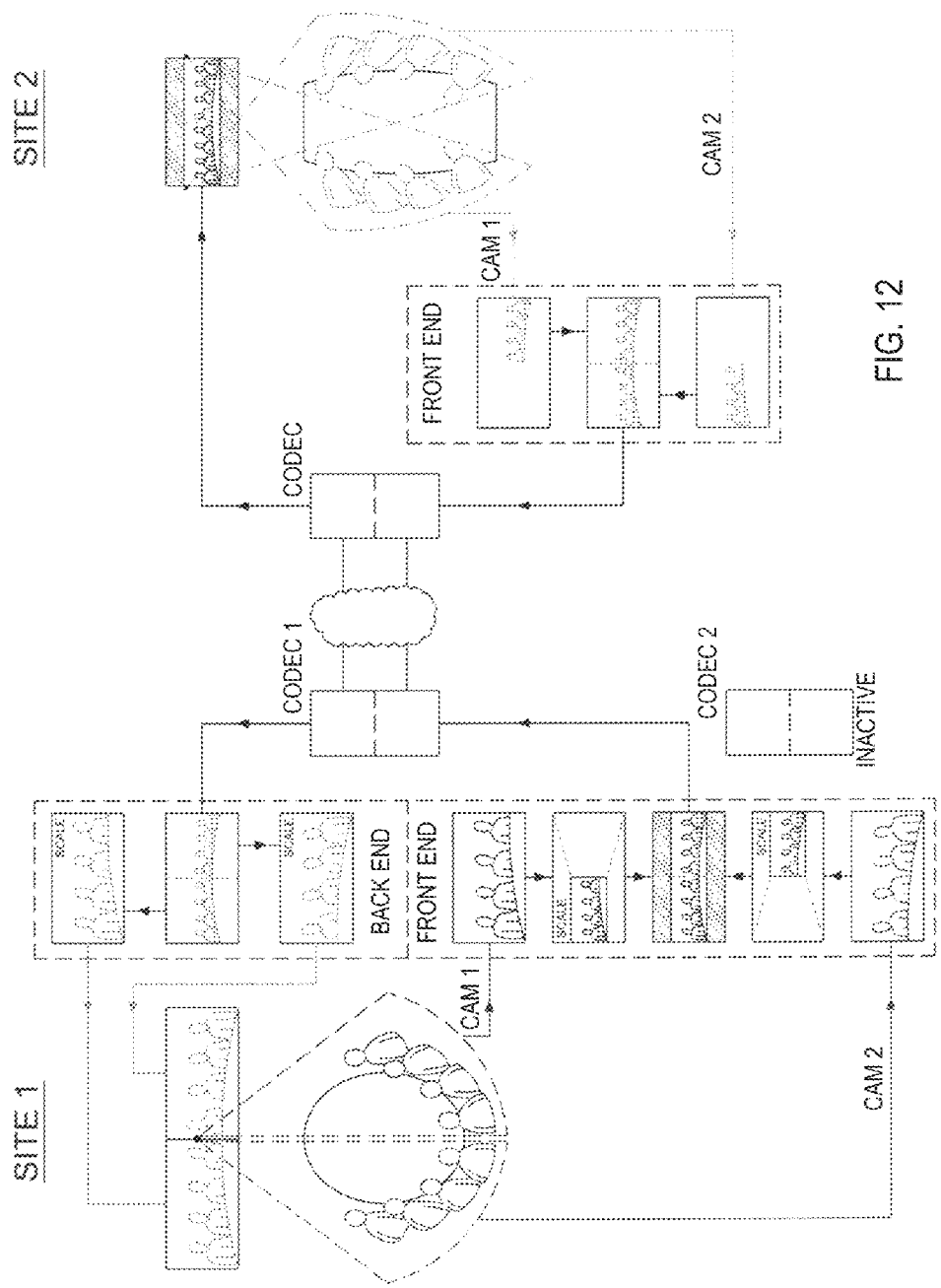
FIG. 12 illustrates a point-to-point video conferencing system according to yet further aspects of the present disclosure.
Figure 13:
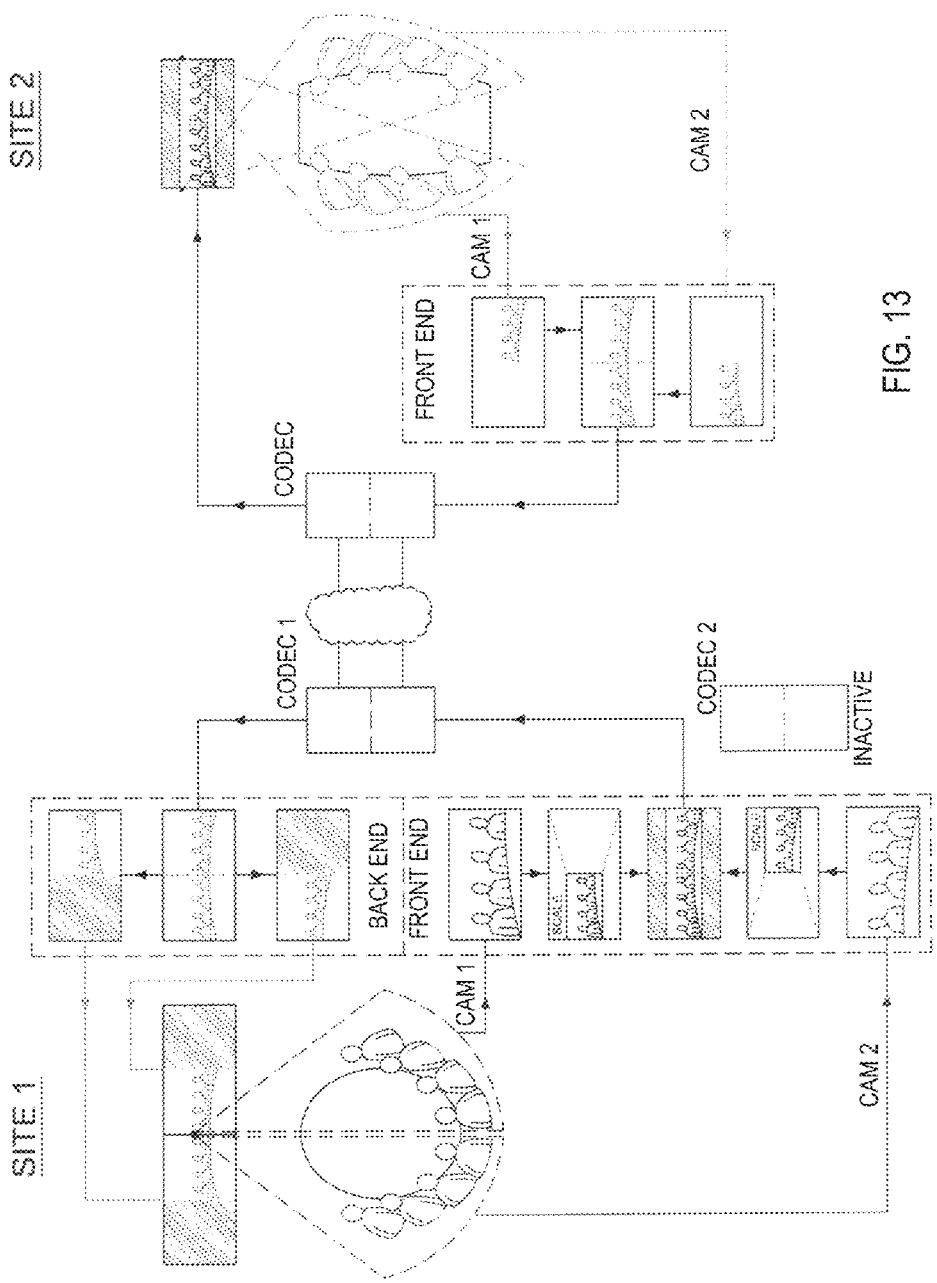
FIG. 13 illustrates a three-way multipoint video conferencing system according to aspects of the present disclosure described with respect to FIG. 10.

The point-to-point video conferencing system illustrated in FIGS. 12-13 represents a variation of the methodology illustrated in FIG. 11 and is particularly well-suited for video conferencing between two sites, where Site 1 comprises a dual-scene conference room and site 2 comprises a single-display, single-scene conference room. More specifically, according to the image processing methodology of FIG. 12, Site 1 is scaled and combined into a single scene for display at Site 2.

Figure 14:
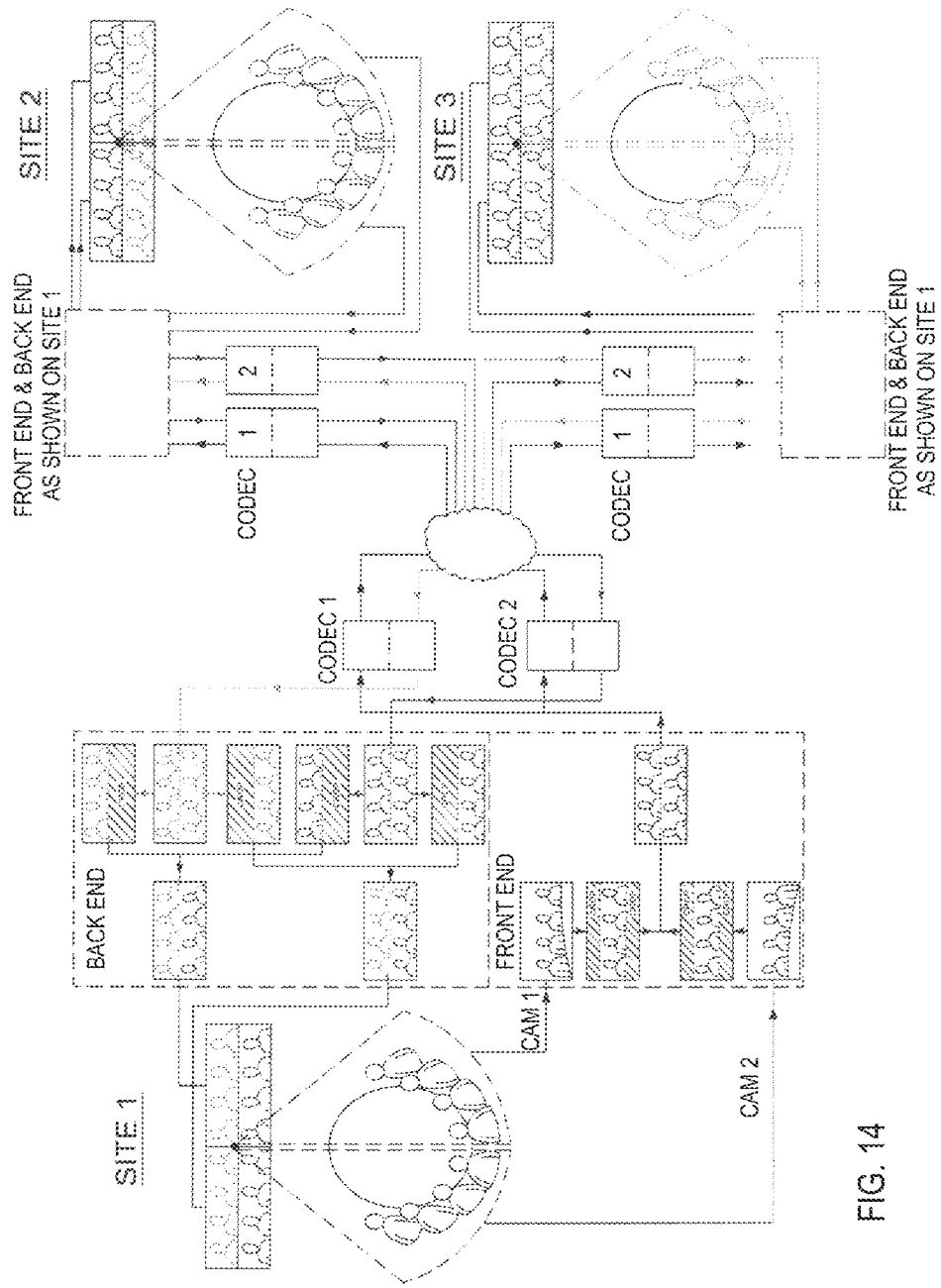
FIG. 14 illustrates a three-way multipoint video conferencing system to aspects of the present disclosure described with reference to FIG. 11.
Figure 15:
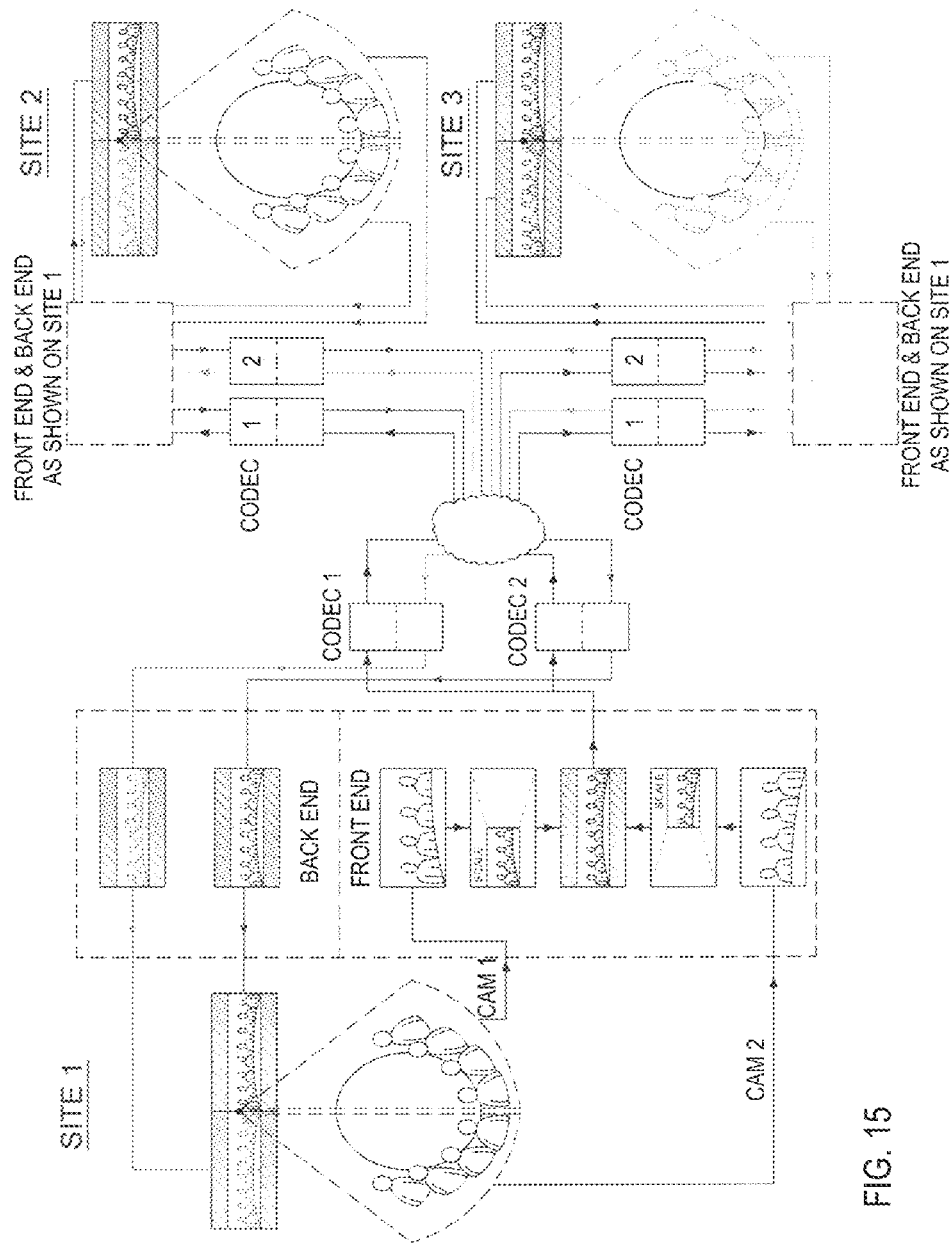
FIG. 15 illustrates a three-way multipoint video conferencing system according to aspects of the present disclosure described with reference to FIG. 12.

FIGS. 14-15 illustrate three-way multipoint video conferencing systems that utilize the image processing concepts of FIGS. 10-13 as building blocks for more complex systems including more than two sites. FIG. 14 represents a three-way multipoint system where the cropping and stacking methodology of FIG. 10 is employed at two sites for display of the scenes from both sites at a single, dual-display site. This type of multipoint video conferencing system represents a relatively efficient use of transmission bandwidth but image data at the top and bottom of the scene is lost in cropping. The image processing scheme of FIG. 15 represents an alternative three-way multipoint system where the cropping and scaling methodology of FIG. 11 is employed to preserve the image data at the top and bottom of the screen. As a trade-off, the processing scheme of FIG. 14 represents a less efficient use of image bandwidth as compared to that of FIG. 14. Finally, the image processing scheme of FIG. 15 represents an alternative three-way multipoint system where the participant emphasizing methodology of FIG. 12 is employed at two sites for display of the scenes from both sites at a single, dual-display site.

Although FIGS. 14-15 have been illustrated as three-way multipoint video conferencing systems, it is contemplated that the systems may be scaled-up to accommodate for additional sites. Scaling-up will be particularly attractive where there are limited numbers of participants at the various sites in which case the processing methodology of FIG. 15 would be attractive.

The image processing components of the various embodiments contemplated herein can be implemented using any of the hardware, software and methods described in greater detail herein.

The image equalization described more fully herein is particularly effective in video conferencing applications. For instance, using an optical system for image equalization preserves image resolution with respect to the participants seated at the far end of the conference room table relative to the camera. Digital equalization provides suitable equalization and is a relatively low-cost and versatile approach to implement image equalization. Accordingly, an embodiment of the present disclosure utilizes a hybrid equalization approach where limited optical equalization is combined with limited digital image equalization. For example, and not by way of limitation, optical image equalization accounts for up to approximately 30% to approximately 50% of the total image equalization necessary for a final equalized image display, with the remainder of the image equalization attributed to digital image equalization. Stated differently, for a conventional 1080p image, approximately 30% to approximately 50% of the pixel reduction at the most condensed portion of the image (closest to the video camera) is attributed to the optical elements of the system.

Moreover, the use of two cameras that are spaced physically apart as described herein, also allows for each camera to use a much smaller field of view. The relatively smaller field of view per camera (compared to the much larger field of view required by a single camera), avoids further problems, such as misperception of depth caused by a single wide angle lens camera used in conventional video conferencing systems. As such, the starting images captured by the cameras disclosed herein suffer less exaggerated size difference in depth of field compared to a convention video conferencing camera because the field of view of the camera described herein, is much closer to the field of view of the display device used to output the video images.

Many modifications and variations of embodiments of the present invention are possible in light of the above description. For example, it is contemplated that the display screens may be curved to approximate the complementary curve of the conference room table, such that a sense of circular connection between the local participants and the panoramic screen display of the remote participants is created.

Also, aspects of the present invention may be implemented using single or multi-camera systems, utilizing single or multiple image sensors in each camera, or other combinations, depending upon the particular implementation. As another example, each camera may be implemented as a sensor.

Still further, it is contemplated that digital image equalization schemes described herein may also employ selective image processing elements that are tailored specifically for video conferencing applications. For example, in an illustrative embodiment, the image is processed to correct the appearance of the front edge of a conference room table. More specifically, optical and digital image equalization can distort the immediate foreground of the image. The foreground of a video image often includes elements such as the front edge of the conference room table. According to an aspect of the present disclosure, additional image processing steps are taken to correct the foreground image so that the front edge of the conference room table approximates the corresponding edge of the table in the viewing conference room.

As will be appreciated by one skilled in the art, aspects of the present invention may be embodied as a system, method or computer program product. Accordingly, aspects of the present invention may take the form of an entirely hardware embodiment, an entirely software embodiment or an embodiment combining software and hardware. Furthermore, aspects of the present invention may take the form of a computer program product embodied in one or more computer readable storage medium(s) having computer readable program code embodied thereon.

The various operations of the systems, methods and computer program products herein may be accomplished using one or more processing circuits. For example a processing circuit may include a field programmable gate array (FPGA), application specific integrated circuit (ASIC), a specific-use processor, a microcontroller, other processor or combinations thereof. As an example, the image equalization system may utilize a general purpose microprocessor coupled to memory, where the memory contains instructions for carrying out the methods described herein.

One or more steps or functions described herein may also be accomplished using non-transitory, machine-readable instructions and data structures stored on machine-readable media. For example, such media may comprise a floppy disc, CD-ROM, DVD-ROM, RAM, EEPROM, flash memory, or any other medium capable of storing the machine-executable instructions and data structures, and which is capable of being accessed by a computer or other electronic device having a processing circuit. Thus, computer program instructions can be stored in a computer readable storage medium that can direct a computer, other programmable data processing apparatus, or other devices of the systems described more fully herein, to function in a particular manner, such that the instructions stored in the computer readable medium produce an article of manufacture including instructions which implement the function/act specified in the flowchart and/or block diagram block or blocks of the figures herein.

The above-described embodiments of the various systems and methods may be used alone or in any combination thereof without departing from the scope of the invention. Although the description and figures may show a specific ordering of steps, it is to be understood that different orderings of the steps are also contemplated in the present disclosure. Likewise, one or more steps may be performed concurrently or partially concurrently.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While particular embodiments of the present disclosure have been illustrated and described, it is contemplated that various other changes and modifications can be made without departing from the spirit and scope of the invention. It is therefore intended to cover in the appended claims all such changes and modifications that are within the scope of this invention.

What is claimed is:

1. A video conferencing system comprising:
    a first camera including a lens;
    a second camera including a lens;
    a processor coupled to the first camera and the second camera; and
    an output coupled to the processor;
    wherein:
        the first camera is positioned at a determined angle to create a first image of a first scene within a first field of view;
        the second camera is positioned at a determined angle to create a second image of a second scene within a second field of view; and
        the processor:
            receives the first image;
            receives the second image;
            equalizes the first image, wherein the processor equalizes with a dual-axis warping function;
            equalizes the second image independently of the first image, wherein the processor equalizes with the dual-axis warping function used to equalize the first image;
            stitches the first equalized image to the second equalized image to create an display image; and
            sends the display image to the output.

2. The video conferencing system of claim 1, wherein:
    equalizing the first image includes:
        identifying an area of interest in the first image; and
        warping the area of interest in the first image according to a first predefined warping function; and
    equalizing the second image includes:
        identifying an area of interest in the second image; and
        warping the area of interest in the second image according to a second predefined warping function.

3. The video conferencing system of claim 2, wherein:
    the first predefined warping function removes perspective from the first image such that the first image appears to have been taken at an angle different from the angle at which the first image was created by the first camera; and
    the second predefined warping function removes perspective from the second image such that the second image appears to have been taken at an angle different from the angle at which the second image was created by the second camera.

4. The video conferencing system of claim 2, wherein:
    the first predefined warping function warps the first image using gradient scaling such that the first image appears to be projected onto a portion of a sphere; and
    the second predefined warping function warps the second image using gradient scaling such that the second image appears to be projected onto a portion of a sphere.

5. The video conferencing system of claim 2, wherein the area of interest of the first image does not overlap the area of interest of the second image.

6. The video conferencing system of claim 2, wherein:
    the first predefined warping removes imaging defects imputed on the image by the lens of the first camera; and
    the second predefined warping removes imaging defects imputed on the image by the lens of the second camera.

7. The video conferencing system of claim 1 further including a mounting mechanism that mounts the first camera such that the pitch of the first camera is at zero degrees.

8. The video conferencing system of claim 1 further including a first mounting mechanism coupled to the first camera, a second mounting mechanism coupled to the second camera, wherein the first mounting mechanism is spaced apart from the second mounting mechanism.

9. The video conferencing system of claim 1, wherein the stitching of the first equalized image to the second equalized image is independent of blending of the first equalized image and the second equalized image.

10. The video conferencing system of claim 1, wherein the lens of the first camera is a gradient lens.

11. A method for adjusting the perspective of images captured in a video conferencing system, the method comprising:
    receiving a first image of a first scene within a first field of view;
    receiving a second image of a second scene within a second field of view;
    equalizing the first image, wherein the equalization is based on a first dual-axis warping function;
    equalizing the second image independently of the first image, wherein the equalization is based on a second dual-axis warping function, wherein the first dual-axis warping function is the same as the second dual-axis warping function;
    stitching the first equalized image to the second equalized image to create a display image; and
    sending the display image to an output device.

12. The method of claim 11, wherein:
    equalizing the first image includes:
        identifying an area of interest in the first image; and
        warping the area of interest in the first image according to a first predefined warping function; and
    equalizing the second image includes:
        identifying an area of interest in the second image; and
        warping the area of interest in the second image according to a second predefined warping function.

13. The method of claim 11, wherein
    warping the area of interest in the first image according to a first predefined warping function includes warping the first image using gradient scaling such that the first image appears to be projected onto a portion of a sphere; and
    warping the area of interest in the second image according to a second predefined warping function includes warping the second image using gradient scaling such that the second image appears to be projected onto a portion of a sphere.

14. The method of claim 11 wherein:
    warping the area of interest in the first image according to a first predefined warping function includes removing perspective from the first image such that the first image appears to have been taken at an angle different from the angle at which the first image was taken; and warping the area of interest in the second image according to a second predefined warping function includes removing perspective from the second image such that the second image appears to have been taken at an angle different from the angle at which the second image was taken.

15. The method of claim 11, wherein stitching of the first equalized image to the second equalized image is independent of blending of the first equalized image and the second equalized image.

* * * * *